(12) United States Patent
Erickson et al.

(10) Patent No.: US 12,136,888 B2
(45) Date of Patent: Nov. 5, 2024

(54) COMPOSITE DC-DC CONVERTER

(71) Applicant: The Regents of the University of Colorado, a body, Denver, CO (US)

(72) Inventors: Robert Erickson, Boulder, CO (US); Dragan Maksimovic, Boulder, CO (US); Vivek Sankaranarayanan, Boulder, CO (US); Aritra Ghosh, Boulder, CO (US); Yucheng Gao, Boulder, CO (US)

( * ) Notice: Subject to any disclaimer, the term of this patent is extended or adjusted under 35 U.S.C. 154(b) by 718 days.

(21) Appl. No.: 17/268,776

(22) PCT Filed: Aug. 16, 2019

(86) PCT No.: PCT/US2019/046952
§ 371 (c)(1),
(2) Date: Feb. 16, 2021

(87) PCT Pub. No.: WO2020/037291
PCT Pub. Date: Feb. 20, 2020

(65) Prior Publication Data
US 2021/0184578 A1    Jun. 17, 2021

Related U.S. Application Data

(60) Provisional application No. 62/718,995, filed on Aug. 16, 2018.

(51) Int. Cl.
*H02J 7/02* (2016.01)
*H02M 3/158* (2006.01)
*H02M 3/335* (2006.01)
*H02M 1/00* (2006.01)

(52) U.S. Cl.
CPC .......... *H02M 3/33584* (2013.01); *H02J 7/02* (2013.01); *H02M 3/1582* (2013.01); *H02M 3/33573* (2021.05); *H02J 2207/20* (2020.01); *H02M 1/0054* (2021.05); *H02M 1/007* (2021.05)

(58) Field of Classification Search
CPC .... H02M 3/33584; H02M 3/1582; H02J 7/02; H02J 2207/20
See application file for complete search history.

(56) References Cited

U.S. PATENT DOCUMENTS

2015/0303815 A1*  10/2015  Chen .................... H02M 3/158
                                                              363/21.04

* cited by examiner

*Primary Examiner* — Robert Grant
(74) *Attorney, Agent, or Firm* — Thomas J. Osborne, Jr.; FisherBroyles, LLP

(57) ABSTRACT

A bidirectional composite converter is provided. The bidirectional composite converter can be used with power electronics, such as but not limited to electric vehicles and other applications. In some implementations, for example, the composite converter may be used in a powertrain of an electric vehicle to couple batteries to a high voltage bus of the vehicle to provide power to the motors and to one or more integrated charging ports (e.g., ac grid wired connections or a wireless charging port) for extremely fast charging. In various implementations, the bidirectional converter architecture may comprise one or more dc transformer modules (DCX's) arranged with output port(s) coupled in series at an output port of the composite converter.

19 Claims, 11 Drawing Sheets

Architecture 1-α

Architecture 1-β

Architecture 1-γ

Architecture 3-α

(e) Architecture 3-β

Architecture 3-γ

(a) CAFE Q versus passive component volume (b) CAFE Q versus MTTF

Architecture 1

Architecture 2

Architecture 3

Architecture 4

(b) Three-winding DCX configuration 1

(b) Three-winding DCX configuration 2

(c) Double DCX configuration

COMPOSITE DC-DC CONVERTER

CROSS-REFERENCE TO RELATED APPLICATIONS

This application claims the benefit of U.S. provisional application No. 62/718,995 entitled "Composite DC-DC Converter" and filed Aug. 16, 2018, which is hereby incorporated by reference as though fully set forth herein.

STATEMENT OF GOVERNMENT RIGHTS

This invention was made with government support under grant number DE-AR0000897 awarded by the U.S. Department of Energy. The government has certain rights in the invention.

BACKGROUND a. Field

The instant invention relates to composite DC-DC converters.

b. Background

DC-DC converters are used with power electronics, such as electric vehicles and other applications. In some implementations, for example, a DC-DC converter may be used in a powertrain of an electric vehicle to couple batteries to a high voltage bus of the vehicle to provide power to the motors and to one or more integrated charging ports (e.g., ac grid wired connections or a wireless charging port) for extremely fast charging.

BRIEF SUMMARY

A bidirectional composite converter is provided. The bidirectional composite converter can be used with power electronics, such as but not limited to electric vehicles and other applications. In some implementations, for example, the composite converter may be used in a powertrain of an electric vehicle to couple batteries to a high voltage bus of the vehicle to provide power to the motors and to one or more integrated charging ports (e.g., ac grid wired connections or a wireless charging port) for extremely fast charging. In various implementations, the bidirectional converter architecture may comprise one or more dc transformer modules (DCX's) arranged with output port(s) coupled in series at an output port of the composite converter.

In one implementation, for example a composite converter comprises a converter input port; a converter output port and at least two DC transformer (DCX) modules each comprising a DCX input port and a DCX output port, wherein the DCX output ports are coupled in series and the DCX input ports of the at least two DCX modules are coupled to the input port. A first converter module comprises a first converter module input port and a first converter module output port. The first converter module is coupled in series with a second DCX module of the at least two DCX modules between the converter input port and the converter output port. A second converter module comprises a second converter module input port and a second converter module output port. The second converter module is coupled between the converter input port and the converter output port. At least one controller is adapted to control at least one switch of the first converter module and the second converter module.

In another implementation, a composite converter comprises a converter input port, a first converter output port and a second converter output port. A DC transformer (DCX) module comprises a DCX input port, a first DCX output port, and a second DCX output port. The first and second DCX output ports are coupled in series and the DCX input port of the DCX module is coupled to the input port. A first converter module comprises a first converter module input port and a first converter module output port. The first converter module is coupled in series with the second DCX output port of the DCX module between the converter input port and the converter output port. A second converter module comprises a second converter module input port and a second converter module output port. The second converter module is coupled between the converter input port and the converter output port. At least one controller is adapted to control at least one switch of the first converter module and the second converter module.

In another implementation, a composite converter comprises a converter input port and a converter output port. A first converter module comprises a first converter module input port and a first converter module output port. The first converter module is coupled between the converter input port and the converter output port. A DC transformer (DCX) module comprises a DCX input port and a DCX output port. The DCX output port is coupled in series with the first converter output port across the converter output port. A second converter module comprises a second converter module input port and a second converter module output port. The second converter module is coupled in parallel with the first converter module between the converter input port and the converter output port. The second converter module is coupled in series with the DCX module between the converter input port and the converter output port. At least one controller is adapted to control at least one switch of the first converter module and the second converter module. In this particular implementation, the DCX output port is coupled in series with the first converter output port across the converter output port.

In another implementation, a composite converter comprises a converter input port and a converter output port. A first converter module comprises a first converter module input port and a first converter module output port. The first converter module being is between the converter input port and the converter output port. A DC transformer (DCX) module comprises a DCX input port and a DCX output port. The DCX output port is coupled in series with the first converter output port across the converter output port. A second converter module comprises a second converter module input port and a second converter module output port. The second converter module is coupled in series with the first converter module between the converter input port and the converter output port. The DCX module is coupled in parallel across the second converter output port between the second converter module and the first converter module. At least one controller is adapted to control at least one switch of the first converter module and the second converter module. In this particular implementation, the DCX output port is coupled in series with the first converter output port across the converter output port.

The foregoing and other aspects, features, details, utilities, and advantages of the present invention will be apparent from reading the following description and claims, and from reviewing the accompanying drawings.

DETAILED DESCRIPTION

Figure 1:
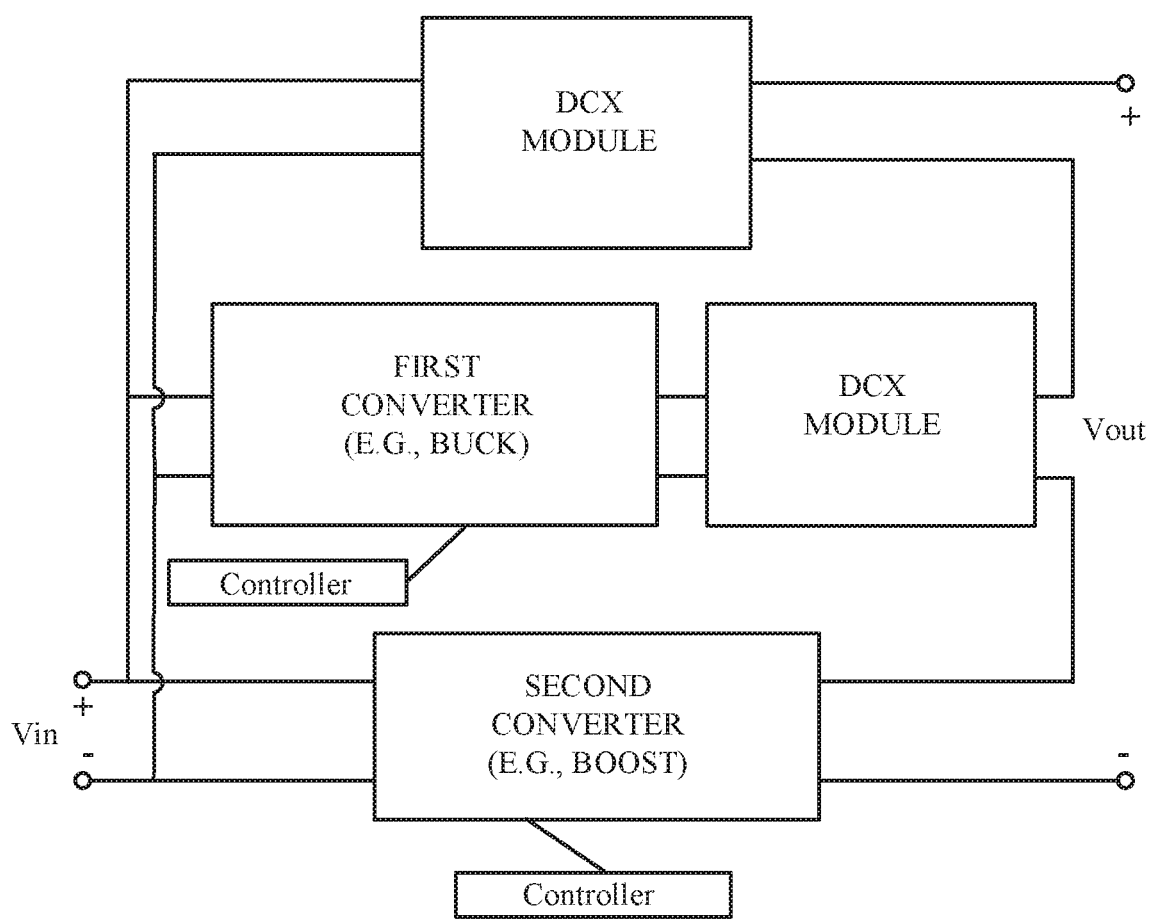
FIG. 1 shows a block diagram of an example implementation of a bidirectional composite converter.

FIG. 1 shows a block diagram of an example implementation of a bidirectional composite converter. The bidirectional composite converter can be used with power electronics, such as but not limited to electric vehicles and other applications. In some implementations, for example, the composite converter may be used in a powertrain of an electric vehicle to couple batteries to a high voltage bus of the vehicle to provide power to the motors and to one or more integrated charging ports (e.g., ac grid wired connections or a wireless charging port) for extremely fast charging. In this particular implementation, the bidirectional converter architecture comprises at least two dc transformer modules (DCX's) arranged with their output ports coupled in series providing the composite converter the ability to significantly increase the voltage level of power delivered to the bus regardless of the battery technology used in the electric vehicle.

In one implementation, DC-DC power conversion incorporating at least two DC transformer modules that each converts an input voltage to an output voltage is provided. In various implementations, a modular DC-DC power conversion is provided to improve converter efficiency over a wide range of conversion ratios and output powers. In one particular implementation, a modular architecture includes at least two DC transformer (DCX) modules and at least one converter module capable of being operated in a pass-through mode. For example, a modular architecture may include a pair of DC transformer modules and at least one of a boost converter module, a buck converter module and a non-inverting buck-boost converter module. The modules may be configured as and controlled such that efficiency is improved.

In one particular implementation, the composite converter architecture comprises a modular dc-dc boost converter system that can substantially improve efficiency over a wide range of input and output voltages. The system includes at least four modules: a buck module, a boost module, and at least two dc transformer modules. These modules are interconnected such that the dc transformer modules have their output ports coupled in series to boost the output voltage of overall composite converter. Depending on the operating point, one or more modules of the converter may operate in pass-through mode, leading to substantially reduced ac losses. The required capacitor size and the transistor voltage ratings are also substantially reduced, relative to a conventional single dc-dc boost converter operating at the same input and output voltages.

In one implementation, for example, a boost DC-DC converter improves the efficiency of a DC-DC boost converter system, through reduction of the AC losses; improves converter efficiency over a range of operating points, i.e., a range of conversion ratios and output powers; reduces capacitor size, through reduction of the RMS capacitor current(s); and/or employs semiconductor power devices having reduced voltage ratings and better performance.

The composite converter module can be adapted to operate in at least two operational states. In a first operational state, a controller is adapted to control the dc transformer modules to shut down with dc transformer module output switches turned on and control the second dc-dc converter module to operate with PWM. In a second operational state, the controller is adapted to perform an operation comprising at least one of (i) controlling a first dc-dc converter module to operate in a pass-through mode, controlling the second dc-dc converter module to operate with pulse-width modulation (PWM) and controlling the pair of dc transformer modules with a fixed conversion ratio and (ii) controlling the second dc-dc converter module to operate in a pass-through mode and controlling the first dc-dc converter module to operate with PWM and controlling the dc transformer modules with a fixed conversion ratio.

In various implementations, a modular DC-DC boost converter architecture employs partial-power modules performing DC transformer (DCX), buck, and boost functions. These modules are able to operate with ultra-high efficiency over a restricted range of operating points and are combined into a system architecture that performs the required DC-DC boost conversion function. The DCX module, for example, is able to perform an isolated boost function at a substantially fixed conversion ratio, with very high efficiency. Boost and buck modules may operate with a restricted range of conversion ratios where their efficiency is very high and where the capacitor current stresses and inductor applied ac voltages are substantially reduced. Voltage sharing between modules allows use of lower-voltage semiconductor devices having better characteristics, and also reduces AC losses. One or more controllers may command the switching of the semiconductor devices of the modules. These controller(s) may employ pass-through modes, in which one or more modules simply connect their input and output ports to achieve a conversion ratio of unity; this improves efficiency by eliminating the AC loss of the module(s). The AC loss of the overall system is reduced, and hence the efficiency is increased over a range of output voltages and powers.

A buck or boost module achieves maximum efficiency in pass-through mode, where the conversion ratio (i.e., the ratio of output to input voltage) is M(D)=1. This is achieved by causing the high-side semiconductor switch to remain in the on state: D=1 for the buck converter, or D=0 for the boost converter. There is no switching loss in the pass-through mode, and the input is connected to the output through the high-side semiconductor device and the inductor. Very high efficiencies are achieved in pass-through mode. Neighboring operating points, with pulse-width modulation at a duty cycle D near the pass-through value, also achieves high efficiency but with some switching loss. Operation at PWM duty cycles farther from the pass-through value is undesirable because of the increased ac losses in the magnetics, increased ac capacitor currents, and overall reduced efficiency.

At least one controller is adapted to control at least one switch in one or more of the converter modules of the composite DC-DC converter.

Figure 2:
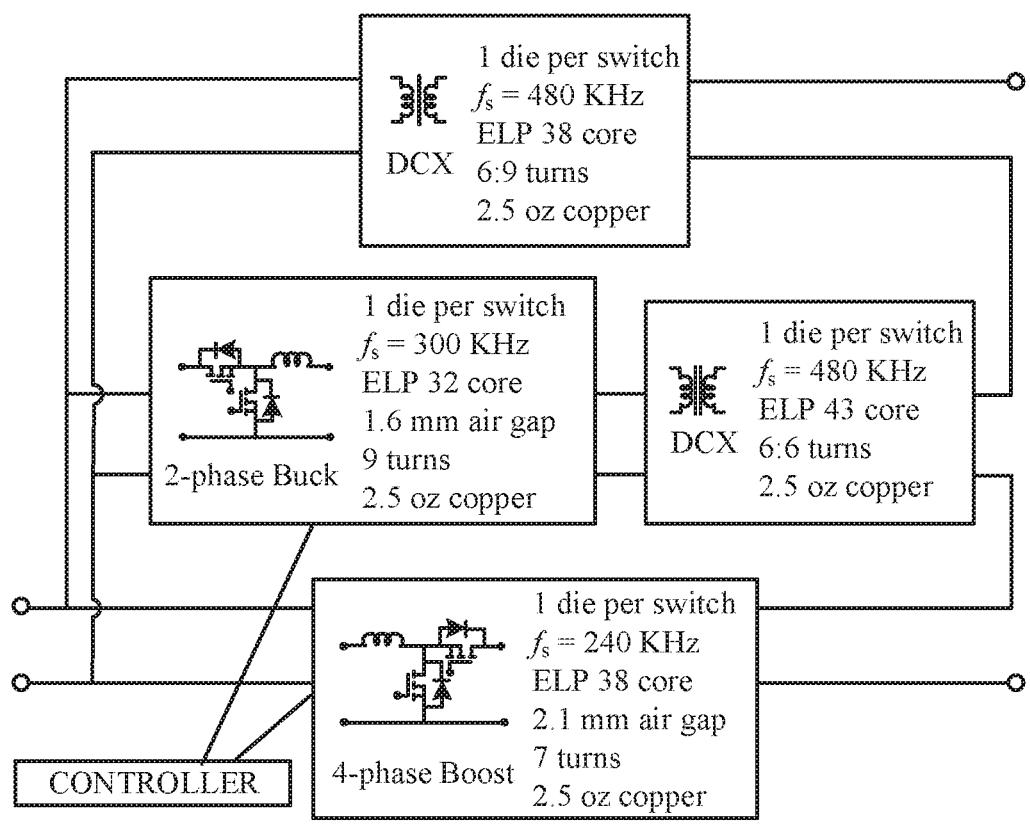
FIG. 2 shows a schematic diagram of one example implementation of the bidirectional composite converter shown in FIG. 1.

FIG. 2 shows a schematic diagram of one example implementation of the bidirectional composite converter shown in FIG. 1, however it is important to note that this is only one example implementation. In this particular implementation, the pair of DC transformers DCX each comprise output ports coupled in series as described above with respect to FIG. 1. In the particular implementation shown in FIG. 2, on an input side, three power conversion paths are connected in parallel, and the converter is controlled such that when operating at full power none of the paths will carry an excessively high portion of power. Consequently, the modules can have a smaller power rating, which is beneficial for low-power efficiency as well as reduction of capacitor size. On an output side, the three modules in series instead of two provides better flexibility for the selection of operating modes. Furthermore, a wide range of output voltage can be achieved by turning on and off one or two DCX modules, so the range of conversion ratio for both the buck and the boost module is reduced, leading to less ac loss and smaller capacitor size.

Among the three paths, the path containing a buck module is the only one that has a two-stage power conversion, and since the associated DCX module has a smaller turn-ratio of 1:1, this path generally takes the smallest portion of power. Hence the extra loss caused by two-stage power conversion can be minimized, and a capacitor size required for the buck module is further reduced.

The 1:1.5 turns ratio of the other DCX module in this example provides an efficient alternative power conversion path featuring a relatively higher voltage conversion ratio, so that when a high output voltage is required, the power conversion can be done more efficiently.

In addition, the selected architecture shows a direction to scale-up the system for applications with even higher output voltage: by stacking DCX modules having inputs connected in parallel and outputs connected in series, a higher maximum output voltage can be achieved. For example, three or more DCX modules may be coupled with their input connected in parallel and their outputs coupled in series in further implementations. For a given output voltage reference, the output voltage is roughly matched by choosing the number of DCX modules to be in operation, and the exact reference is achieved by utilizing the buck or the boost modules. As there is always only one buck module and one boost module in the system, and they never process extra high power nor require an aggressive voltage conversion ratio, one would expect the system overall efficiency to be close to the efficiency of DCX, and the capacitor size to be minimized.

Table 1 provides an estimated performance of the selected composite architecture shown in FIG. 2.

TABLE 1

| Item | Performance |
|---|---|
| CAFE Q factor | 122.4 |
| FTP-75 Q factor | 119.7 |
| HWFET Q factor | 124.8 |
| Film capacitor size | 0.24 J/kW |
| Volume of passive elements (film caps and planar magnetics) | 431 cm$^3$ |
| Power density of passive elements | 232 kW/L |
| Estimated volume of heat sink | 770 cm$^3$ |
| Power density of passive elements and heat sink | 83 kW/L |
| Number of 900 V, 10 mΩ dies | 36 |
| Number of half-bridge modules | 14 |
| CAFE-weighted MTTF | 2,851 khrs |
| CAFE-weighted MTTF for gate drivers | 4,772 khrs |
| CAFE-weighted MTTF for SiC-MOSFETs | 82,584 khrs |
| CAFE-weighted MTTF for capacitors | 7,748 khrs |

At least one controller is adapted to control at least one switch in one or more of the converter modules of the composite DC-DC converter.

Figure 3A:
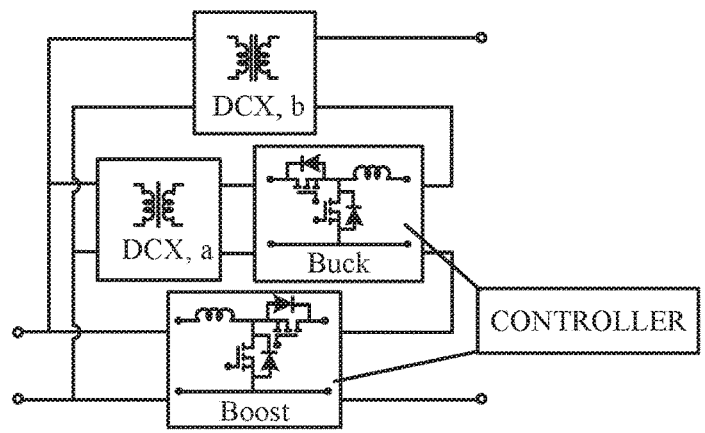
FIGS. 3A-3F are schematic diagrams of additional example implementations of a bidirectional composite DC-DC converter.

FIGS. 3A-3F are schematic diagrams of additional example implementations of a bidirectional composite DC-DC converter. In FIG. 3A, for example, a DC-DC converter comprises input ports of two DCX modules DCX,a and DCX,b and a boost DC-DC converter coupled in series. The first DCX module DCX,a is coupled in series with a buck DC-DC converter and output ports of the second DCX module DCX,b, the buck DC-DC converter and the boost converter modules are coupled in series across the output of the bidirectional composite DC-DC converter.

Figure 3B:
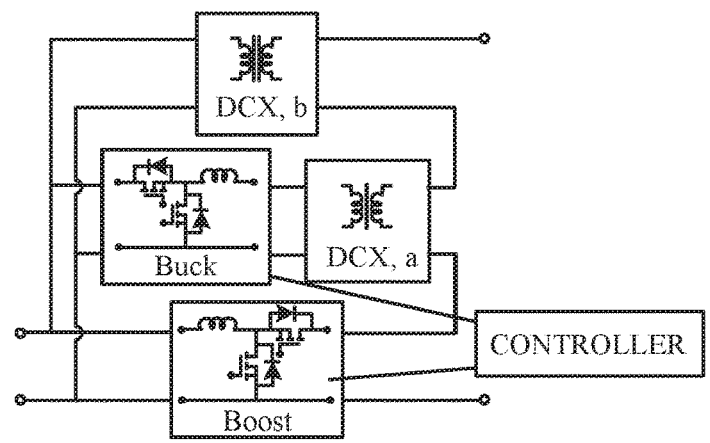

FIG. 3B shows a similar architecture to FIG. 3A, but the position of the buck DC-DC converter and the first DCX module DCX,a are reversed. In particular, the composite DC-DC converter shown in FIG. 3B comprises input ports of the second DCX module DCX,b, a buck DC-DC converter and a boost DC-DC converter coupled in series. The buck DC-DC converter and the first DCX module DCX,a are coupled in series, and output ports of the second DCX module DCX,b, the first DCX module DCX,a and the boost converter modules are coupled in series across the output of the bidirectional composite DC-DC converter.

Figure 3C:
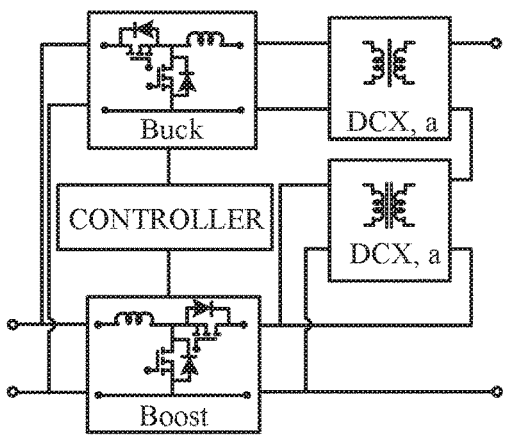

FIG. 3C shows yet another example architecture implementation of a bidirectional composite DC-DC converter. In this particular example, input ports of a buck DC-DC converter and a boost DC-DC converter are coupled in parallel with each other at an input port of the composite DC-DC converter. The buck DC-DC converter is coupled in series with a first DCX module DCX,a, and an output of the boost DC-DC converter is coupled in parallel with an input of a second DCX module DCX,b. Output ports of the first DCX module DCX,a and the second DCX module DCX,b are coupled in series along with the output of the boost DC-DC converter.

Figure 3D:
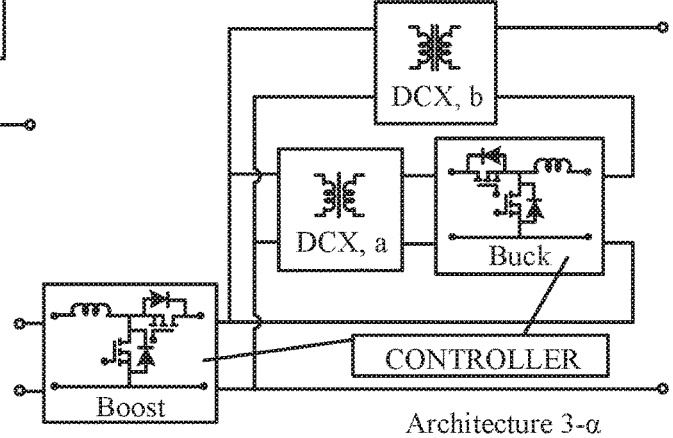

FIG. 3D shows another example architecture implementation of a bidirectional composite DC-DC converter. In this particular implementation, an input port of a boost DC-DC converter is coupled across an input port of the bidirectional composite DC-DC converter. Input ports of a first DCX module DCX,a and a second DCX module DCX,b are coupled in parallel across an output port of the boost DC-DC converter. The first DCX module DCX,a is coupled in series with a buck DC-DC converter and output ports of the second DCX module DCX,b and the buck DC-DC converter are coupled in series with the output port of the boost DC-DC converter across an output port of the overall bidirectional composite DC-DC converter.

Figure 3E:
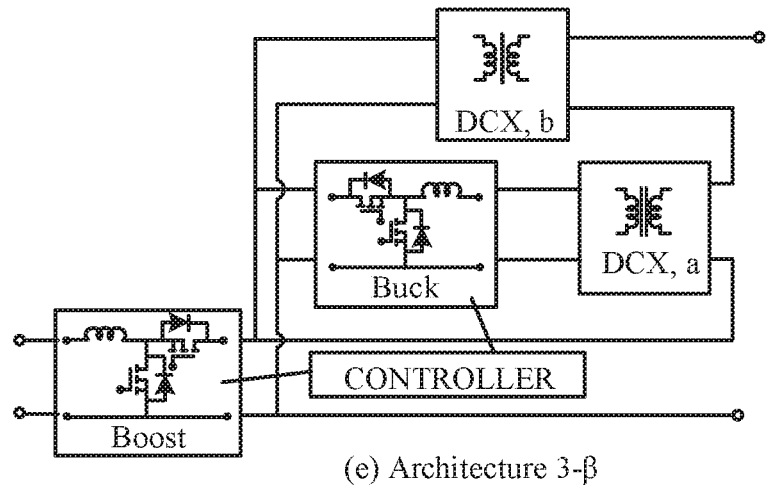

FIG. 3E shows yet another example architecture implementation of a bidirectional composite DC-DC converter. In this particular implementation, an input port of a boost DC-DC converter is coupled across an input port of the bidirectional composite DC-DC converter. Input ports of a buck DC-DC converter and a second DCX module DCX,b are coupled in parallel across an output port of the boost DC-DC converter. The buck DC-DC converter is coupled in series with a DCX module DCX,a, and output ports of the second DCX module DCX,b and the first DCX module DCX,a are coupled in series with the output port of the boost DC-DC converter across an output port of the overall bidirectional composite DC-DC converter.

Figure 3F:
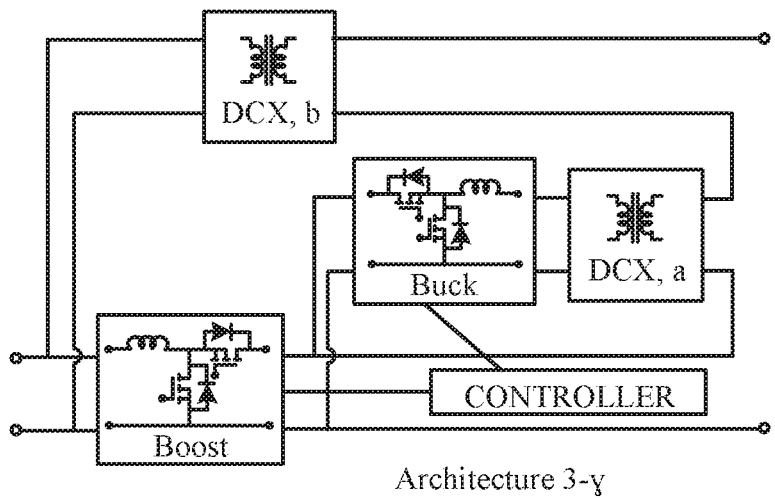

FIG. 3F shows another example architecture implementation of a bidirectional composite DC-DC converter. In this particular implementation, an input port of a boost DC-DC converter is coupled across an input port of the bidirectional composite DC-DC converter. An input port of a second DCX module DCX,b is coupled in parallel with the input port of the boost DC-DC converter. An input port of a buck DC-DC converter is coupled in parallel across an output port of the boost DC-DC converter. The buck DC-DC converter is coupled in series with a first DCX module, and output ports of the second DCX module DCX,b and the first DCX module DCX,a are coupled in series with the output port of the boost DC-DC converter across an output port of the overall bidirectional composite DC-DC converter.

In each of the implementations shown in FIGS. 3A-3F, at least one controller is adapted to control at least one switch in one or more of the converter modules of the composite DC-DC converter.

Figure 4:
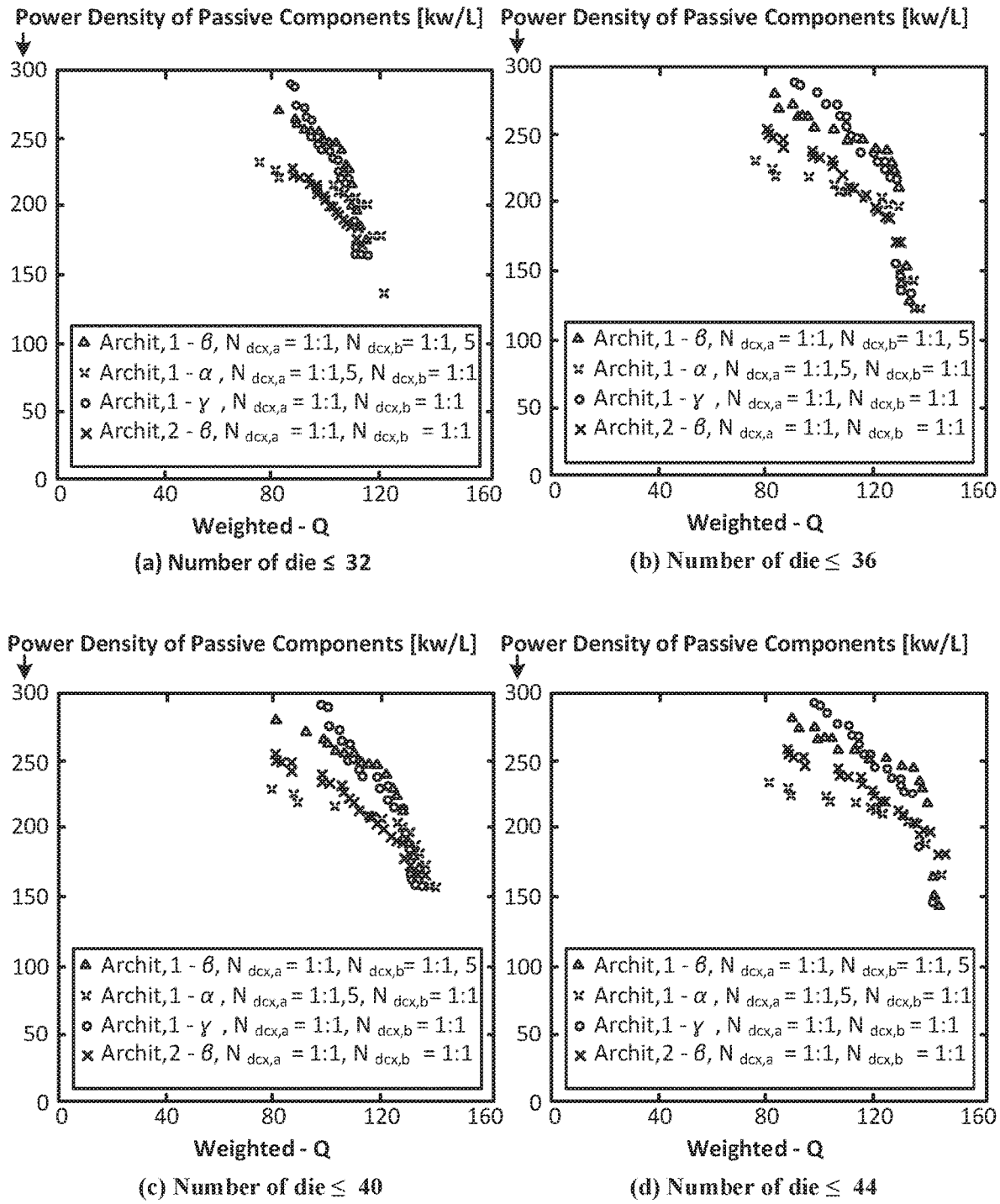
FIGS. 4-6 are graphs showing figures of merit for the example architecture variants shown in FIGS. 3A-3F, for the example of a 100 kW composite boost system having a dc input (battery) voltage range of 200-400 V, and a dc output voltage of up to 1200 V, and using commercially available 900 V SiC MOSFET die with on resistance of 10 milliohms each.
Figure 5:
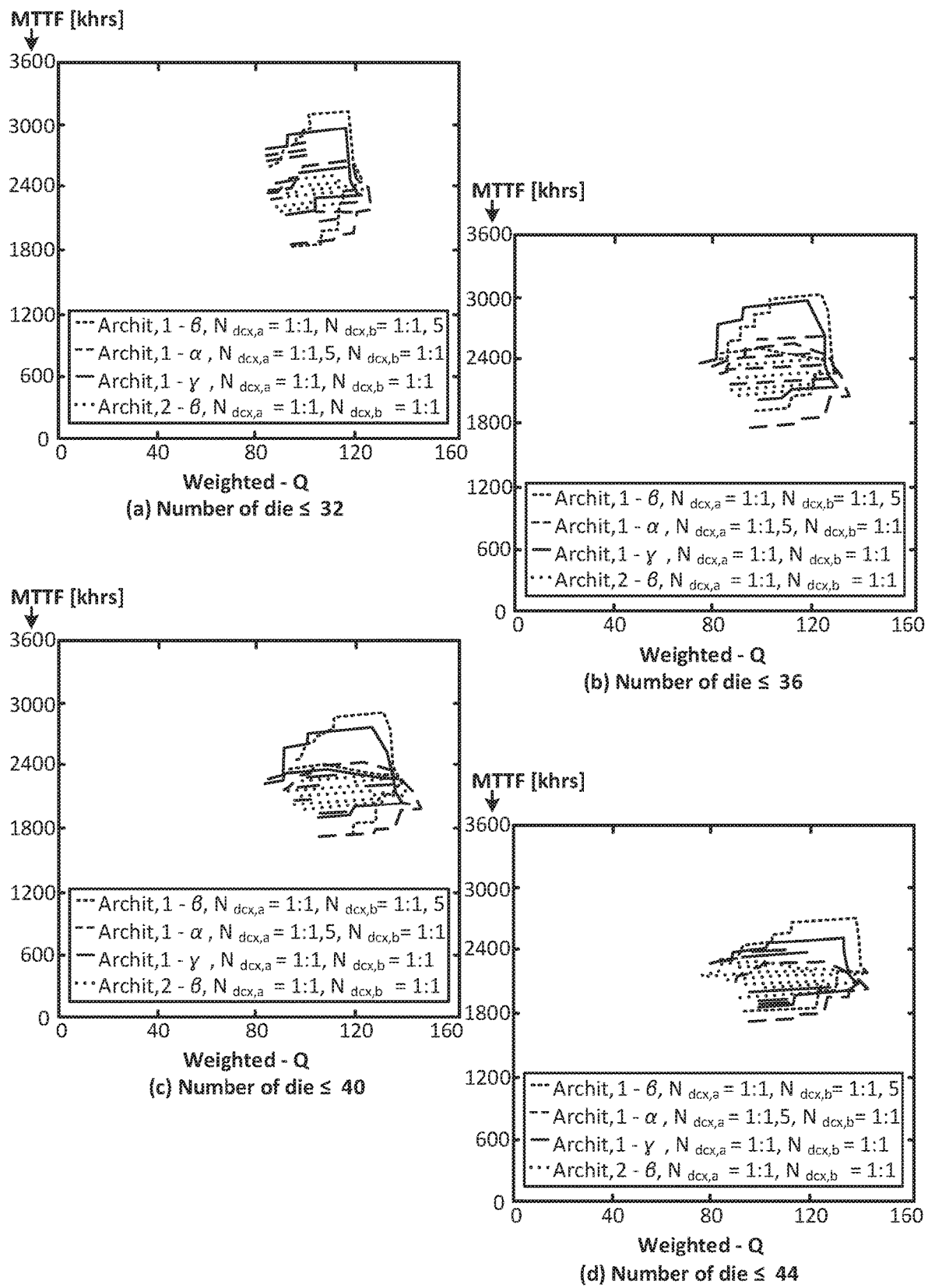
Figure 6:
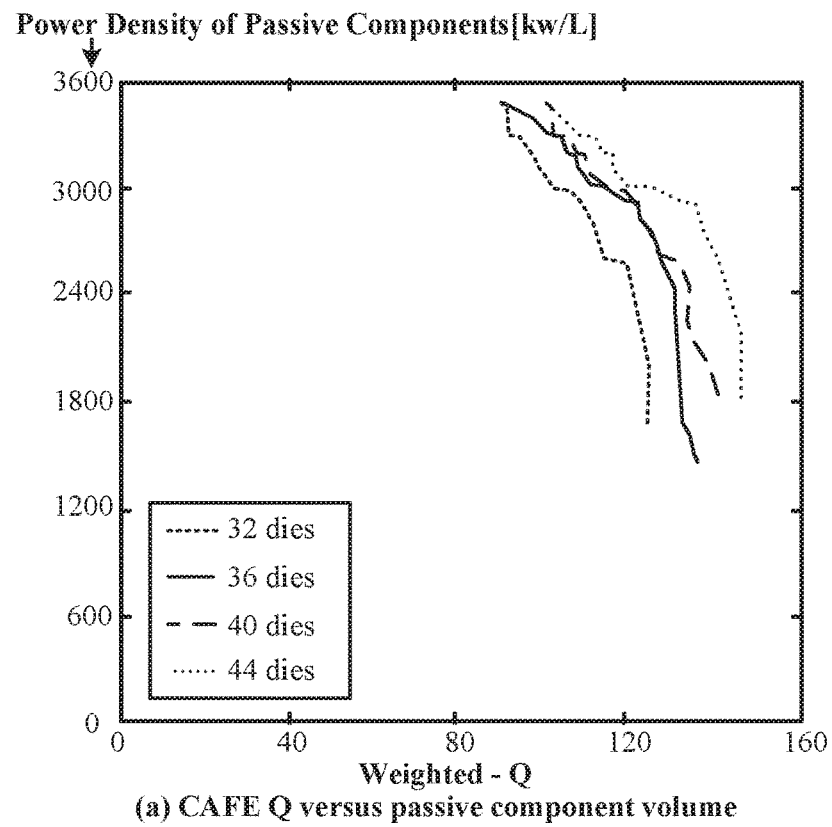
Figure 6:
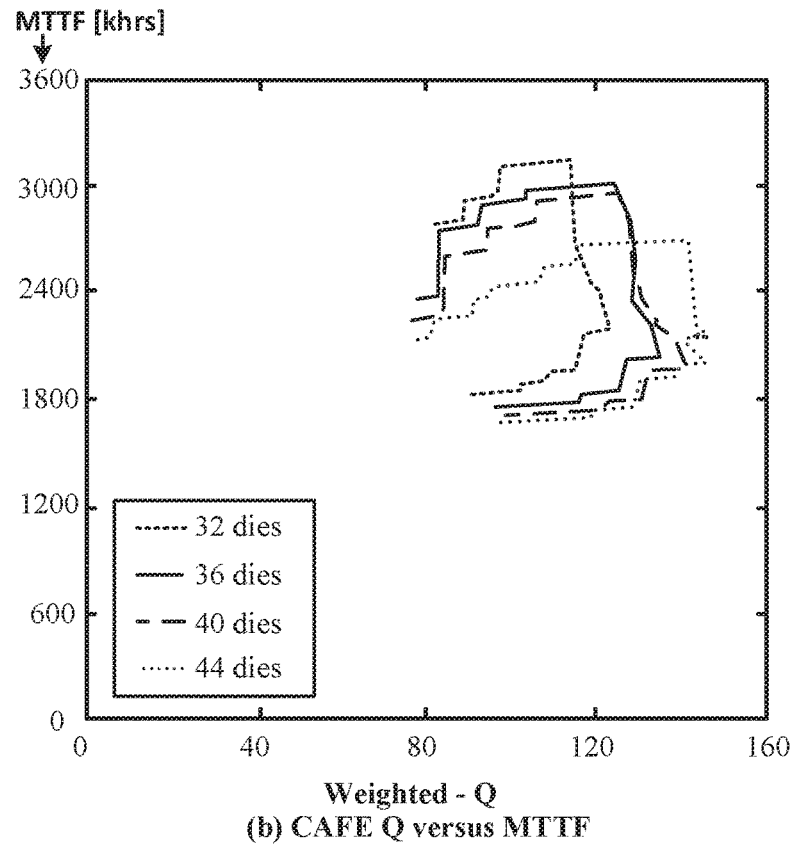

FIGS. 4-6 show figures of merit for the example architecture variants shown in FIGS. 3A-3F, for the example of a 100 kW composite boost system having a dc input (battery) voltage range of 200-400 V, and a dc output voltage of up to 1200 V, and using commercially available 900 V SiC MOSFET die with on resistance of 10 milliohms each. Here, the converter Q factor is defined as the ratio of output power to loss power; it is desired to maximize Q. In the example of the drive train power electronics of an electric vehicle, it may be desirable to define Q as the total output energy divided by the total loss energy over a standard drive cycle. We define the CAFE-weighted Q by averaging the Q for city and highway drive cycles according to US EPA definitions. For each architecture, an inflection point can be observed, which is considered to be the best tradeoff point for CAFE-weighted Q-factor and passive component volume. Among the architectures, architecture 1-β with NDCX,a=1:1, NDCX,b=1:1.5 has the best inflection point. Architecture 1-β with NDCX,a=1:1.5, NDCX,b=1:1 has a superior efficiency when the total number of die is limited to 40. Moreover, Architecture 2β with NDCX,a=NDCX,b=1:1, which is equipped with a high power boost module, exhibits better efficiency when a great number of die are allowed.

The system mean time to failure (MTTF) can be estimated using standard industry formulas, and this can provide one measure for comparison of system architectures. The estimated MTTF of the four most promising architectures are plotted in FIG. 5. Generally, a higher Q factor reduces the temperature of the heat sink, and as a result the system has the potential to reach higher MTTF. However, the designs with the very highest Q usually do not achieve the highest MTTF: the most efficient designs employ very small inductances within the buck and the boost modules, which causes high capacitor rms currents, and consequently the MTTF of the system is reduced owing to a greater number of capacitors. Therefore, it is the design with slightly lower Q factor but much smaller capacitor rms current that turns out to exhibit the highest MTTF.

Among the four architectures, Architecture 1-β generally has the best balance between Q factor and MTTF. On the contrary, Architecture 1-β, although being able to achieve very high Q factor, does not achieve a very high MTTF because of the large capacitor size. In FIG. 6, the outline of the limits under different number of die is plotted. The curves show that by increasing the number of die from 32 to 36, a significant performance improvement can be expected, whereas further increasing the number of die from 36 to 40 no longer results in a significant improvement. From 40 to 44 the CAFE-weighted Q factor can be improved, but there is no benefit in terms of volume and MTTF.

In summary, a number of die of 36 is chosen for the final design in this example, and the architecture 1-β with $N_{DCX,a}$=1:1, $N_{DCX,b}$=1:1.5 is picked as a selected architecture. The detailed configuration of each module for this particular example is specified in FIG. 2.

Figure 7A:
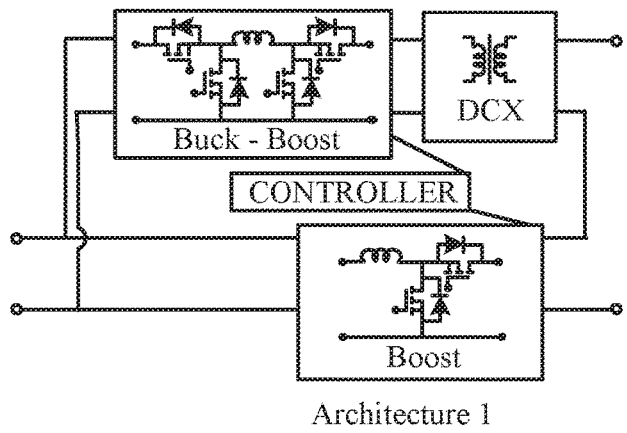
FIGS. 7A-7D are schematic diagrams showing four additional single DCX module bidirectional composite DC-DC converter architectures including a single DCX module.

FIGS. 7A-7D are schematic diagrams showing four additional single DCX module bidirectional composite DC-DC converter architectures including a single DCX module. In FIG. 7A, for example, a first example implementation comprises input ports of a boost DC-DC converter and a buck-boost DC-DC converter coupled in parallel across an input port of the overall composite DC-DC converter. A DCX module is coupled in series with the buck-boost DC-DC converter. Output ports of the DCX module and the boost DC-DC converter are coupled in series across an output port of the overall composite DC-DC converter. In this implementation (Architecture 1), a boost capability is added to a DCX path by replacing the buck module of some implementations with a buck-boost module, so that a wider output voltage range is achieved with a low DCX turns ratio.

Figure 7B:
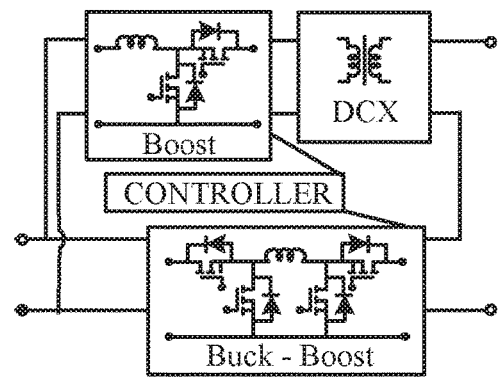

FIG. 7B shows another example implementation of a bidirectional composite DC-DC converter including a single DCX module. In this implementation, input ports of a buck-boost DC-DC converter and a boost DC-DC converter are coupled in parallel across an input port of the overall composite DC-DC converter. A DCX module is coupled in series with the boost DC-DC converter. Output ports of the DCX module and the buck-boost DC-DC converter are coupled in series across an output port of the overall composite DC-DC converter. In this implementation, (Architecture 2), a boost module is coupled in series with the DCX module for low DCX turns ratio design, and a buck-boost module is used to provides higher flexibility for operating modes.

Figure 7C:
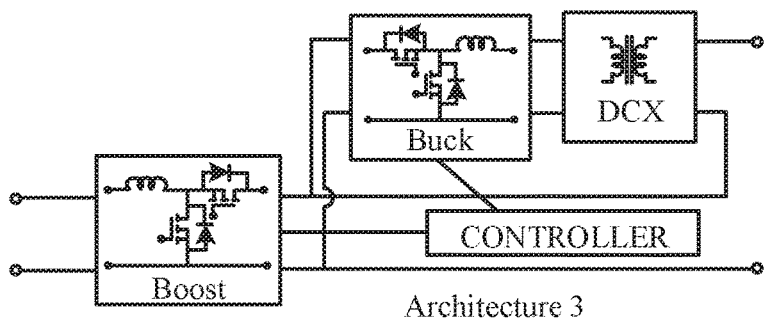

FIG. 7C shows another example implementation of a bidirectional composite DC-DC converter including a single DCX module. In this implementation, a boost DC-DC converter is coupled across an input port of the overall composite DC-DC converter. An input port of a buck DC-DC converter is coupled in parallel with an output port of the boost DC-DC converter, and the buck DC-DC converter is coupled in series with a DCX module. An output port of the DCX module is coupled in series with the output port of the boost DC-DC converter across an output port of the overall composite DC-DC converter.

Figure 7D:
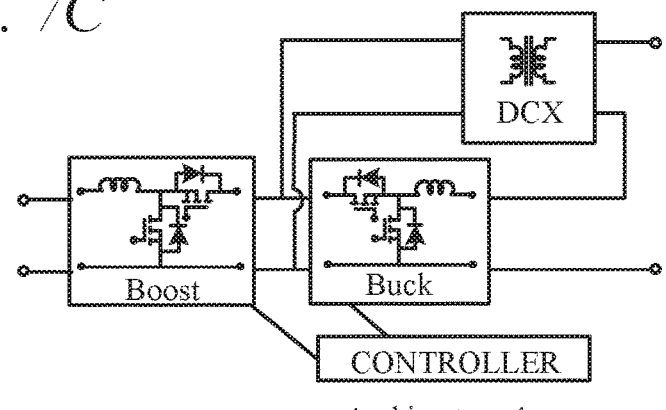

FIG. 7D shows yet another example implementation of a bidirectional composite DC-DC converter including a single DCX module. In this implementation, a boost DC-DC converter is coupled across an input port of the overall composite DC-DC converter. A buck DC-DC converter is coupled in series with the boost DC-DC converter. An input port of a DCX module is coupled in parallel with an output port of the boost DC-DC converter and the input port of the buck DC-DC converter. An output port of the DCX module is coupled in series with the output port of the buck DC-DC converter across an output port of the overall composite DC-DC converter.

In FIG. 7C (Architecture 3) and FIG. 7D (Architecture 4), a full-power boost module is applied to combine the boost capability for both paths of the composite DC-DC converter.

In each of the implementations shown in FIGS. 7A-7D, at least one controller is adapted to control at least one switch in one or more of the converter modules of the composite DC-DC converter.

Figure 8A:
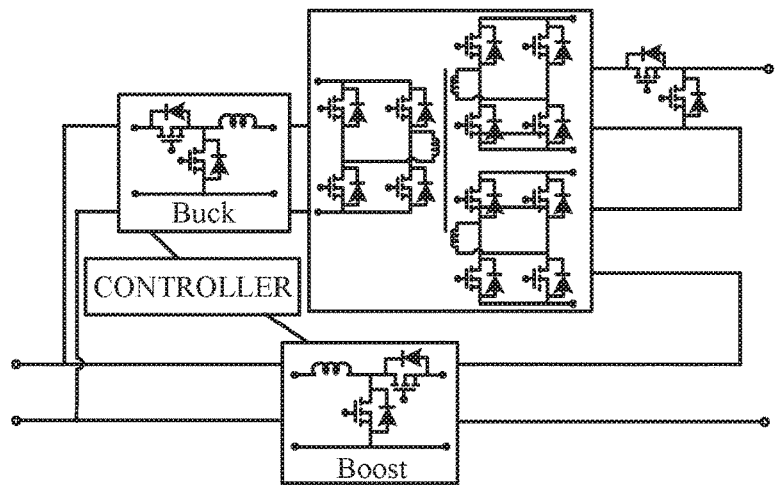
FIGS. 8A-8C are schematic diagrams showing additional implementations of a bidirectional composite DC-DC converter.
Figure 8B:
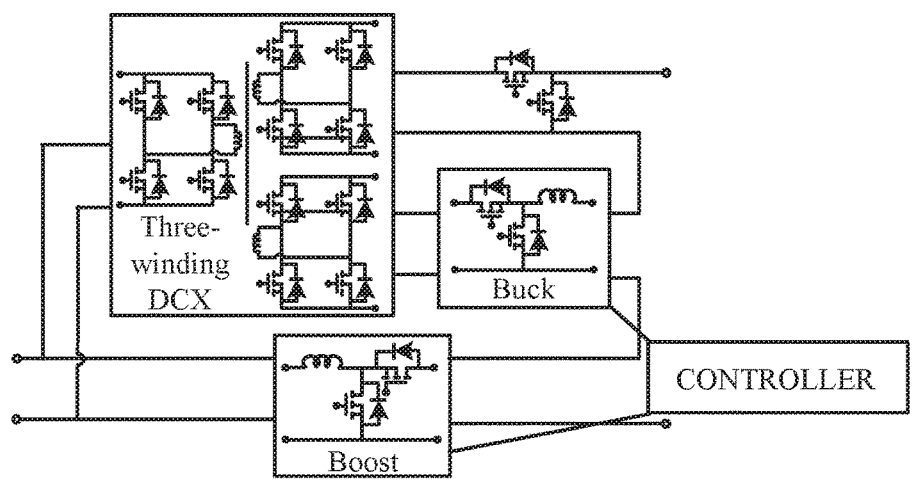
Figure 8C:
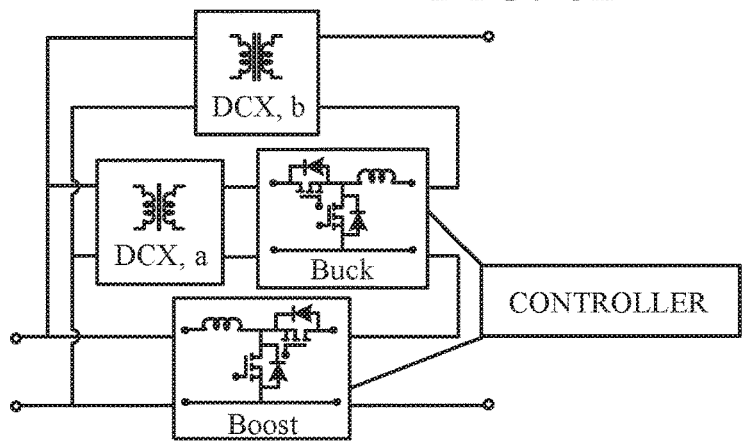

FIGS. 8A-8C are schematic diagrams showing additional implementations of a bidirectional composite DC-DC converter. In FIG. 8A, for example, a buck module is added in series with a three-port DCX module in front of the DCX module, and in FIG. 8B a buck module is added in series with a three-port DCX module after one of the output ports. While the former may require a less aggressive conversion ratio, the latter is expected to process lower power.

FIG. 8C shows another variant of a composite DC-DC converter in which a three-port DCX is divided into two normal two-port DCXs. In comparison with the three-port DCX implementations shown in FIGS. 8A and 8B, this design may not be able to use the magnetic material as effectively, but it eliminates the complexity of control of the three-port DCX, and it avoids the need for the extra two switches.

In each of the implementations shown in FIGS. 8A-8C, at least one controller is adapted to control at least one switch in one or more of the converter modules of the composite DC-DC converter.

A composite DC-DC converter can also be coupled to an on-board charger module and a wireless charging port coupled to the composite converter and is adapted to provide a charging current to one or more energy storage device(s) (e.g., an electric vehicle battery pack) for charging the energy storage device(s) via the input port of the composite DC-DC converter. The on-board charger module, for example, may comprise an ac grid port for coupling the charger module with an external ac grid coupled to an inverter (e.g., a full-bridge inverter), which, in turn, is coupled to one or more converters (e.g., the boost and buck boost converters shown) and another inverter (e.g., the full-bridge inverter shown) coupled to at least transformer winding. The transformer winding may be coupled to one or both of the DCX modules as shown. The wireless charging port comprises a wireless input port and an inverter (e.g., the full bridge inverter shown) that is in turn coupled to the input port of one or both of the DCX modules.

Figure 9:
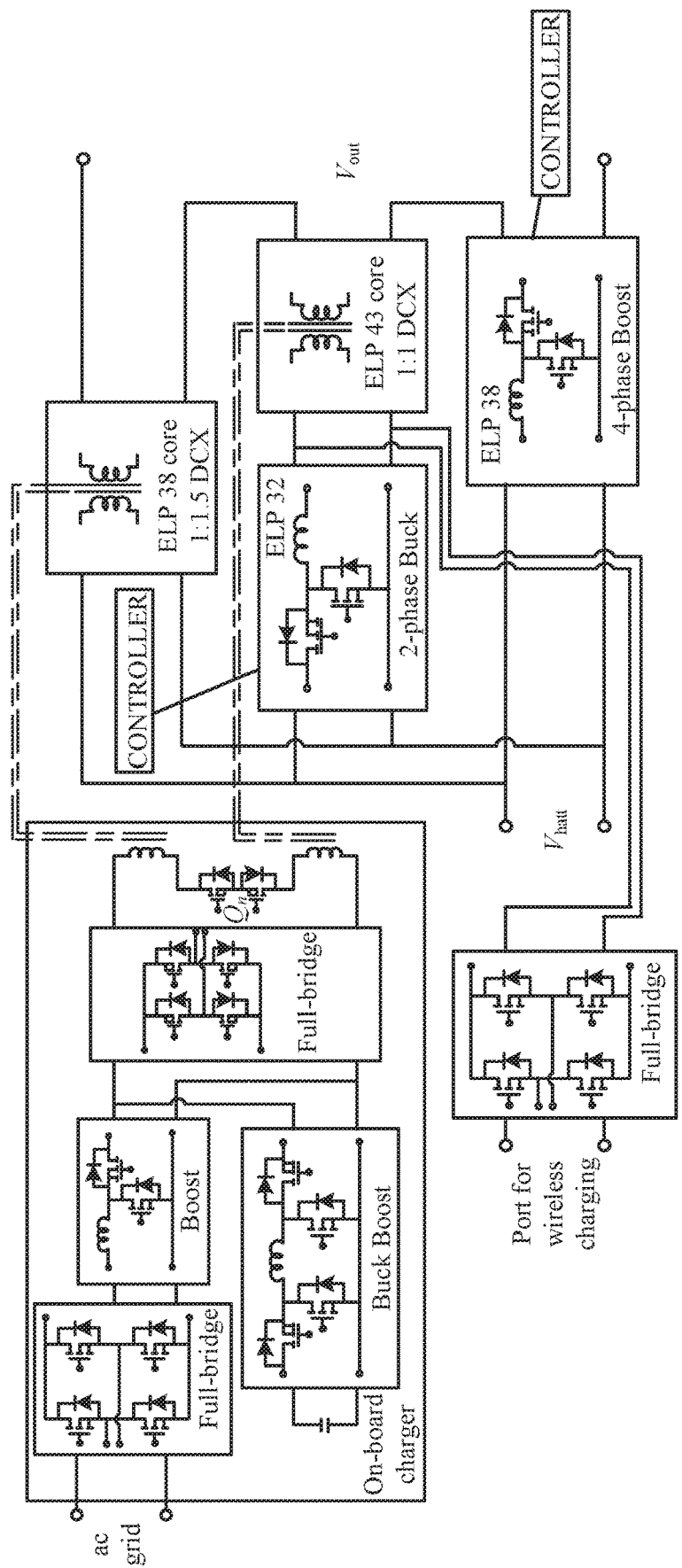
FIG. 9 is a schematic diagram showing yet another example architecture implementation of a bidirectional composite DC-DC converter.

FIG. 9 is a schematic diagram showing yet another example architecture implementation of a bidirectional composite DC-DC converter. In this particular implementation, for example, wired and wireless charging modules are provided for coupling the bidirectional composite DC-DC converter to an ac grid and a wireless charging port, respectively. In this particular implementation, a full-bridge rectifier is coupled to an ac grid port of the wired charging module and is further coupled in series with a boost DC-DC converter. An output port of the boost DC-DC converter is coupled in parallel with an output port of a buck-boost DC-DC converter across an input port of another full bridge rectifier. An output port of the second full-bridge rectifier is coupled to a dual transformer that is, in turn coupled to each of the DCX modules in the composite DC-DC converter as shown in FIG. 9.

The wireless port comprises a full-bridge rectifier and is further coupled to the composite DC-DC converter between an output port of a 2 phase buck DC-DC converter and an input port of a DCX module coupled in series with the buck DC-DC converter as shown in FIG. 9.

Figure 10:
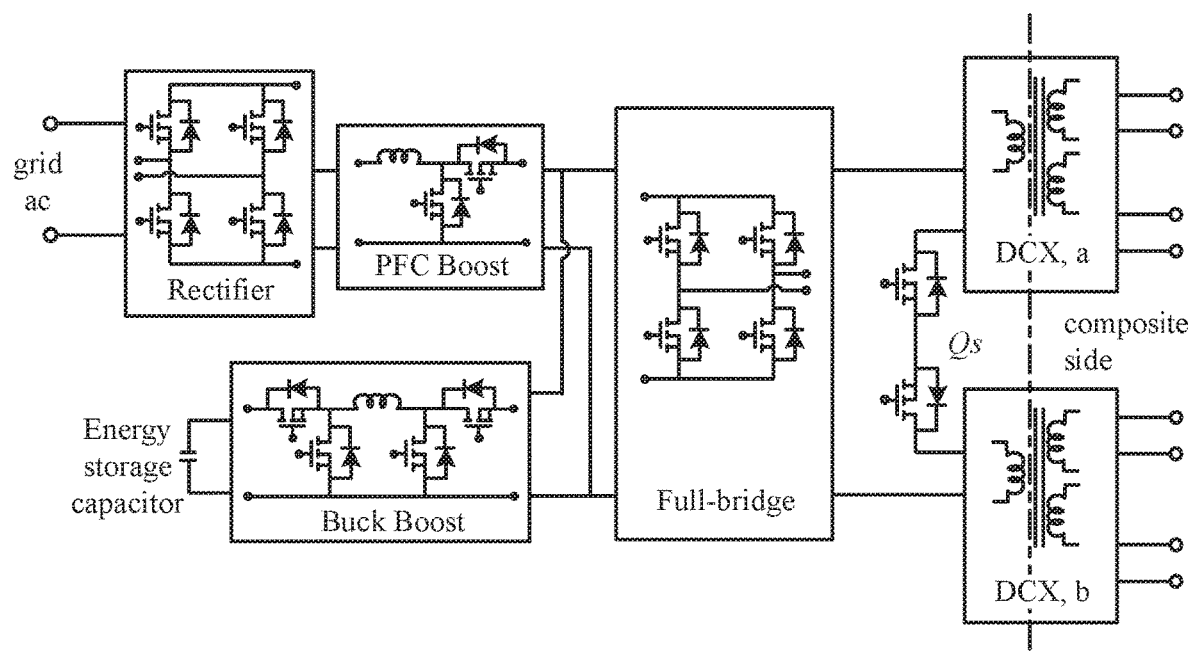
FIG. 10 is a schematic diagram showing another architecture of example integrated on-board charger that may be used with a composite DC-DC converter.

FIG. 10 is a schematic diagram showing another architecture of example integrated on-board charger that may be used with a composite DC-DC converter. In this particular implementation, both of the two DCX modules in a composite architecture are used. A voltage bidirectional switch Qs is provided and is turned OFF when the system is powering an inverter, so that the windings on the charger side will be open circuit, and the dc bus of the charger will not be charged. When the system is connected to the grid, Qs will be turned-ON, and the two transformers will be connected in series on the charger side, and in parallel on the battery side. The two DCX modules work as a single 1:2 DCX when the buck module operates in pass-through mode, and when the buck module steps down voltage, the equivalent conversion ratio is reduced, providing extra voltage conversion range to the system. Another advantage of this design is that the two DCX modules and the buck module takes approximately half of the power, so the efficiency is expected to be higher.

Since the secondary of a wireless charger does not require additional isolation, the wireless charging port can be connected to a non-isolated module output port, such as the output port of a boost module.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A composite converter comprising:
   a converter input port;
   a converter output port;
   at least two DC transformer (DCX) modules each comprising a DCX input port and a DCX output port, wherein the DCX output ports are coupled in series and the DCX input ports of the at least two DCX modules are coupled to the input port;
   a first converter module comprising a first converter module input port and a first converter module output port, the first converter module being coupled in series with a second DCX module of the at least two DCX modules between the converter input port and the converter output port
   a second converter module comprising a second converter module input port and a second converter module output port, the second converter module being coupled between the converter input port and the converter output port; and at least one controller adapted to control at least one switch of the first converter module and the second converter module.

2. The composite converter of claim 1 wherein the first converter module comprises a buck converter module and the second converter module comprises a boost converter module.

3. The composite converter of claim 1 wherein the first converter module is coupled between the converter input port and the second DCX module.

4. The composite converter of claim 1 wherein the first converter module is coupled between the second DCX module and the converter output port.

5. The composite converter of claim 1 wherein a charger module is coupled to the composite converter.

6. The composite converter of claim 5 wherein the charger module comprises an charger module adapted to be coupled to an ac grid.

7. The composite converter of claim 6 wherein the charger module comprises an on-board charger module comprising at least one transformer winding coupled to a winding of at least one of the DCX modules of the composite converter.

8. The composite converter of claim 5 wherein the charger module comprises a wireless charging module, the wireless charging module is adapted to receive a wireless charging signal and is coupled to the second DCX module of the composite converter.

9. The composite converter of claim 1 wherein the at least one controller comprises a pair of controllers each of the pair of respective controllers controlling one of the first and second converter modules.

10. A composite converter comprising:
a converter input port;
a first converter output port and a second converter output port;
a DC transformer (DCX) module comprising a DCX input port, a first DCX output port, and a second DCX output port, wherein the first and second DCX output ports are coupled in series and the DCX input port of the DCX module is coupled to the input port;
a first converter module comprising a first converter module input port and a first converter module output port, the first converter module being coupled in series with the second DCX output port of the DCX module between the converter input port and the converter output port;
a second converter module comprising a second converter module input port and a second converter module output port, the second converter module being coupled between the converter input port and the converter output port; and
at least one controller adapted to control at least one switch of the first converter module and the second converter module.

11. The composite converter of claim 10 wherein the first converter module comprises a buck converter module and the second converter module comprises a boost converter module.

12. The composite converter of claim 10 wherein the first converter module is coupled between the converter input port and the second DCX output port.

13. The composite converter of claim 10 wherein the first converter module is coupled between the second DCX output port and the converter output port.

14. The composite converter of claim 10 wherein a charger module is coupled to the composite converter.

15. The composite converter of claim 14 wherein the charger module comprises a charger module adapted to be coupled to an ac grid.

16. The composite converter of claim 15 wherein the charger module comprises an on-board charger module comprising at least one transformer winding coupled to at least one winding of the DCX module of the composite converter.

17. The composite converter of claim 14 wherein the charger module comprises a wireless charging module, the wireless charging module is adapted to receive a wireless charging signal and is coupled to the DCX module of the composite converter.

18. The composite converter of claim 10 wherein the at least one controller comprises a pair of controllers each of the pair of controllers controlling a respective one of the first and second converter modules.

19. A composite converter comprising:
a converter input port;
a converter output port;
a first converter module comprising a first converter module input port and a first converter module output port, the first converter module being coupled between the converter input port and the converter output port;
a DC transformer (DCX) module comprising a DCX input port and a DCX output port, wherein the DCX output port is coupled in series with the first converter output port across the converter output port;
a second converter module comprising a second converter module input port and a second converter module output port, the second converter module being coupled in series with the first converter module between the converter input port and the converter output port, the DCX module being coupled in parallel across the second converter output port between the second converter module and the first converter module; and
at least one controller adapted to control at least one switch of the first converter module and the second converter module,
wherein the DCX output port is coupled in series with the first converter output port across the converter output port.

* * * * *